United States Patent [19]
Rolin et al.

[11] 3,985,972
[45] Oct. 12, 1976

[54] TELEPHONE CALL RESTRICTOR

[76] Inventors: Robert J. Rolin, 1410 Willowtree Court, San Jose, Calif. 95119; Richard Arden Sales, 3055 Jenkins, San Jose, Calif. 95118

[22] Filed: Aug. 8, 1974

[21] Appl. No.: 495,654

[52] U.S. Cl. .............................................. 179/18 DA
[51] Int. Cl.² ............................................ H04M 1/66
[58] Field of Search ............................... 179/18 DA

[56] References Cited
UNITED STATES PATENTS

| | | | |
|---|---|---|---|
| 3,736,383 | 5/1973 | LeBaron | 179/18 DA X |
| 3,851,109 | 11/1974 | Downs | 179/18 DA |

*Primary Examiner*—William C. Cooper

[57] ABSTRACT

A telephone call restrictor is described for restricting telephone calls from one or more trunk or extension lines to a select group of telephone numbers. The restrictor comprises a digit coupler for detecting a predetermined number of the digits of the number called — e.g., three, six or nine. One or more of the detected digits is individually decoded for providing a first output corresponding to the numerical value of the digit decoded. The detected digits not decoded are used to address a programmable read only memory (PROM). The memory is prearranged to contain code words corresponding to acceptable telephone numbers. The outputs of the decoder and memory are compared. If the digits decoded and the digits used to address the memory are from an acceptable telephone number, a predetermined correspondence exists between the output of the decoder and the output of the memory indicating an acceptable number has been dialed. If the correspondence does not exist, a memory abort signal is generated for causing a dial tone to reappear on the lines, restricting the call.

22 Claims, 5 Drawing Figures

TELEPHONE CALL RESTRICTOR

BACKGROUND OF THE INVENTION

The present invention is related to telephone equipment in general and in particular to a novel apparatus for restricting the telephone numbers which can be called from one or more telephone trunk or extension lines.

A typical telephone number comprises seven digits. The first three digits identify an exchange area in a particular locality. The last four digits identify a particular phone unit or a particular group of phone units in the exchange area having the same number. Other numbers, such as three-digit area codes, are frequently added to the seven-digit number for identifying groups of exchange areas in different parts of the country and are used in long-distance calls where direct dialing is available. Special single and multi-digit numbers are also employed for identifying special functions.

Two types of telephone transmitter-receiver units are presently in wide use. The best known and probably still the most widely used at the present time is the dial phone. A more recent development, known as multifrequency signalling, is, however, rapidly replacing the dial equipment in many areas. In dial equipment, there is generated a series of voltage pulses for each digit of a number dialed. If the number seven is dialed, for example, seven pulses are generated. If the number five is dialed, five pulses are generated, etc. In multifrequency signalling equipment, on the other hand, instead of voltage pulses, multi-frequency a.c. signals are generated for each digit as each multifrequency signalling digit button is depressed.

Business and professional offices each year are employing an ever increasing number of phone units for the conduct of business. While a great number of these phones are usually connected to a main telephone system through a local operator-controlled telephone switchboard, the operators of these boards are, due to heavy work loads, not in a position to exercise a great deal of control over the calls made. Also, with the advent of direct dialing, as those terms are used in connection with both dial as well as multifrequency signalling equipment, the use of local switchboards is frequently no longer required and has been dispensed with by many.

The elimination of switchboards and the reduced responsibility of operators in checking calls, while generally improving telephone service, has permitted an ever increasing rise in the amount of use of business phones for unauthorized calls. Such calls, for example, may be placed by employees, as well as by members of the public who may have been given authorization to use the phone for "local" calls, but frequently use the phones for toll calls as well. This costly situation has been found by many to be nearly impossible to control. Either for technical reasons or in order to maintain good public relations, businesses are, therefore, prone to use some sort of toll restrictor equipment which automatically restricts the calls or telephone numbers which can be called from a particular phone.

Several automatic call restrictor systems have been proposed and a number are presently commercially available. all such known systems, however, are generally large and cumbersome, complex and expensive, and not easily modified to quickly and inexpensively accept changes in the acceptable numbers which can be called. Many known systems are also severely restricted in the number of digits that can be used for checking the acceptability of telephone numbers.

SUMMARY OF THE INVENTION

In view of the foregoing, a principal object of the present invention is a relatively simple, inexpensive, easily programmable telephone toll restrictor apparatus.

Another object of the present invention is a telephone toll restrictor apparatus which may be used to restrict calls from an individual telephone trunk line, a plurality of trunk lines, and from dial as well as multifrequency signalling equipment.

A still further object of the invention is a telephone call restrictor apparatus which is easily expandable to accommodate changes in the number of digits used for telephone number checking purposes.

In accordance with these objects there is provided, in a three-digit checking embodiment of the present invention, a digit coupler comprising a digit detector for detecting the first three digits of a telephone number as they are dialed and appear on a telephone trunk line. The detected digits are used for checking whether the number of which they are a part is an acceptable number. Coupled to the digit detector is a counter. The counter is advanced by the detector upon the receipt of each digit. In the three-digit checking embodiment of the invention, the first three digits (an exchange code) of a seven-digit number appearing on the telephone trunk line are routed to three digit registers through a gate circuit under the control of the counter. The digit register receiving the first digit is coupled to a modified 1-out-of-10 decoder having eight output lines. The digit registers receiving the second and third digits are coupled to an eight-bit-word programmable read-only memory (PROM) having a corresponding set of parallel output lines. The decoder and memory have eight instead of ten output lines since neither the digit "0" or the digit "1" is used as the first digit in any exchange code, and the decoder is modified accordingly. The decoder decodes the first digit to output a predetermined signal — e.g., a logical "1" — on one of its eight output lines depending on the numerical value of the digit. The second and third digits are used to address the PROM for reading out in parallel an eight-bit word on its output lines. Corresponding ones of the output lines of the decoder and the PROM are fed to a comparison circuit. A comparison between corresponding bits appearing on the output lines of the decoder and PROM is made and, if a predetermined correspodence exists, the telephone call is completed. If an acceptable correspondence does not exist, the call is aborted by the generation of an interrupt signal which is operative to place a dial tone on the telephone trunk line.

To obtain the predetermined correspondence between the outputs of the decoder and the PROM when an acceptable number is dialed, eight-bit code words comprising logical "1's" and "0's" are provided in predetermined word locations in the PROM for each such number. The make-up of the code word — that is, the location of the logical "1's" and "0's" in the word — is determined by reference to the first digit of the three-digit exchange code of the acceptable number. The location of the code word in the PROM is determined by the second and third digits. Thus, for example, if 794 is the exchange code for an acceptable number, a logical "1" is located in the digit 7 bit location in the word location addressed by the digits 94. Similarly, if 894 is the exchange code for an acceptable number, a logical "1" is located in the digit 8 bit location in the word location addressed by the digits 94. If no other exchange code of an acceptable number includes as its second and third digits the digits 94, the eight-bit code word located at address 94 is 00000110, corresponding to the digits 2, 3, 4, 5, 6, 7, 8 and 9.

It follows from the foregoing, that if the number 694-3572 is dialed, logical "1's" appear on the digit 6 output line of the decoder and on the digit 7 and 8 output lines of the PROM. Comparing the bits on the corresponding output lines immediately reveals that there is no logical "1" on the digit 6 output line of the PROM and, hence, the sought-after predetermined correspondence does not exist. Consequently, there is provided by the comparator circuit the previously described interrupt signal.

Another feature of the invention is circuit means for generating an interrupt signal when an attempt is made to dial the operator.

Another feature of the invention is circuit means, including a plurality of decoders and memories, for using six and nine digits for checking purposes.

Still another feature of the invention is circuit means for using either the three, the six or the nine-digit checking apparatus for restricting calls from a plurality of trunk lines.

DESCRIPTION OF THE DRAWINGS

The above and other objects, features and advantages of the present invention will become apparent from the following detailed description and accompanying drawings in which.

DETAILED DESCRIPTION

Figure 1:
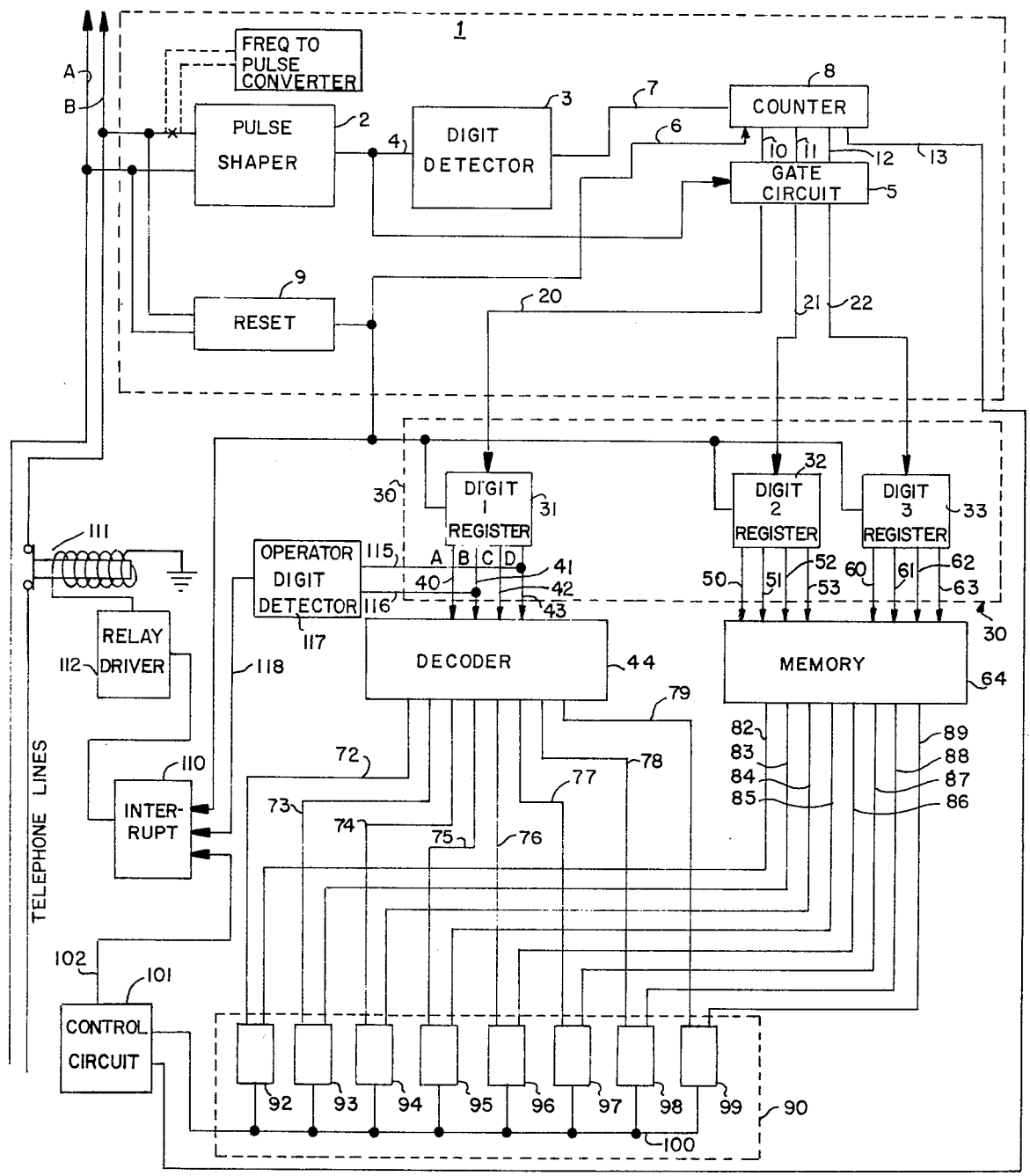
FIG. 1 is a block diagram of a three-digit checking embodiment of the present invention.

Referring to FIG. 1, there is illustrated a pair of telephone lines A and B which normally carry the dial tone generated by a central exchange, telephone messages between a telephone instrument, the exchange and other instruments and the electrical signals representative of the digits of a telephone number dialed.

Coupled to lines A and B is a digit coupler 1. Coupler 1 comprises a pulse shaper 2 for shaping the electrical signals representing the digits of a telephone number dialed on an instrument (not shown) coupled to lines A and B. After shaping, the pulses are sent to a digit detector 3 on a line 4 and to a gate circuit 5 on a line 6. Digit detector 3 comprises a conventional mono-stable multivibrator for detecting each digit of the number dialed. As the voltage pulses of a digit enter detector 3, the multivibrator is set to its unstable state and remains in that state until the normally occurring time period between digits. When the multivibrator returns to its stable state, a counter-advance signal is generated on an output line 7 which advances a counter 8.

Counter 8 is a conventional four-stage counter having four output lines 10, 11, 12 and 13. Lines 10, 11 and 12 are provided to couple, respectively, three of the counter stages to the gate circuit 5. Line 13 is provided to output from the fourth stage a comparator control signal on receipt of the fourth advance signal. Counter 8 determines the number of digits which are used for checking purposes and, as described below with respect to FIGS. 2 and 3, will comprise additional stages when additional digits are used for checking purposes.

Gate circuit 5 is provided with a plurality of output lines 20, 21 and 22, which are coupled to a digit register circuit 30 comprising a plurality of digit registers 31, 32 and 33. As counter 8 is advanced by counter-advance signals from digit detector 3, conventional AND gate circuit means (not shown) in gate circuit 5 route in series the first three digits of a telephone number from pulse shaper 2 to digit registers 31, 32 and 33, respectively. As described below with respect to FIGS. 2 and 3, gate circuit 5 comprises additional AND gate circuit means when additional digits are used for checking purposes.

Digit registers 31, 32 and 33 each comprise conventional four-stage registers having a plurality of output lines. Register 31 is provided with four output lines 40, 41, 42 and 43, which are coupled to a modified 1-out-of-10 decoder 44. Digit registers 32 and 33 are provided each with four output lines 50, 51, 52 and 53 and 60, 61, 62 and 63 for addressing a memory 64.

Decoder 44 comprises a plurality of eight output lines 72, 73, 74, 75, 76, 77, 78 and 79 for providing an output as a function of the numerical value of the digit contained in digit register 31. Thus, if the digit 2 appears in register 31, an output will appear on line 72, conveniently called the digit 2 output line. The output appearing on line 72 is a binary or logical "1" such that the output of decoder 44 on lines 72–79 will appear as 10000000. Similarly, if the digit in register 31 is an "8", a logical "1" will appear on line 78, conveniently called the digit 8 output line, and the decoder 44 output will appear on lines 72–79 as 00000010. Likewise, if a "5" appears in register 31, the output of decoder 44 will be 00010000. The decoder 44 has eight instead of ten output lines since neither the digit "0" or the digit "1" is used as the first digit in any exchange codes. Accordingly, only the second through ninth output lines are used.

Memory 64, coupled to digit registers 32 and 33, comprises a plurality of 8-bit word locations. Corresponding bit locations in each of the word locations are coupled in a conventional manner to a common output line such that memory 64 is provided with a plurality of eight output lines 82, 83, 84, 85, 86, 87, 88 and 89. The contents of registers 32 and 33, coupled to memory 64, are used for addressing the word locations.

Coupled to the output lines of decoder 44 and memory 64 is a comparator circuit 90. Comparator circuit 90 comprises a plurality of comparators 92, 93, 94, 95, 96, 97, 98 and 99 for comparing the output signals on corresponding pairs of the decoder 44 and memory 64 output lines. Thus comparator 92 is coupled to and receives its input from lines 72 and 82. Comparator 93 is coupled to and receives its input from lines 73 and 83, and so on. Comparators 92–99 may comprise, for example, AND gate circuits. Each of the comparators 92–99 has an output line for outputting a signal if there is an acceptable correspondence between the signals appearing on its respective input line pairs and all of said comparator outputs are coupled to a common line 100 for outputting a signal if any one of the comparators 92–99 provides such an output. The line 100 is coupled to a comparator control or timing circuit 101, which may comprise a conventional NAND gate circuit. The control circuit 101 is also coupled to line 13 from counter 8 and is provided with an output line 102 for providing an output from comparator circuit 90 in the event that there is no output on line 100 at the time the control signal from counter 13 is received. The control signal from counter 13 is received on receipt of the fourth digit.

An output from control circuit 101 on line 102 is for convenience called an interrupt signal. Coupled to line 102 and responsive to the interrupt signal is an interrupt circuit 110. Interrupt circuit 110 comprises an RC circuit for providing a 1.5 sec. output in response to an input for driving a relay driver 112. Driver 112 controls a switch circuit 111 to open and close line B. When line B is opened for 1.5 seconds, a dial tone is placed on the line.

To prevent completion of a call to an operator, there is further provided, coupled to output lines 41 and 43 of digit register 31 by means of a pair of input lines 115 and 116, an operator digit detector 117 having an output line 118 coupled to the interrupt circuit 110. Detector 117 is coupled to lines 41 and 43 to detect the binary equivalent 0101 of the normal operator code "0", which is itself the equivalent of the decimal digit "10" in conventional telephone systems. A reset circuit 9 is coupled also to lines A and B and provides an output in response to a change in potential on lines A and B when the telephone unit is taken from its cradle. The output of reset circuit 9 is used to reset the counter 8, digit registers 31, 32 and 33 and provide an interrupt signal to interrupt circuit 110 to prevent dialing by simply activating the cradle switch.

In operation, three digits are routed to digit registers 31, 32 and 33 for checking purposes. The digits are typically the first three digits (prefix or exchange code) of a conventional seven-digit telephone number. These digits may comprise any number from 000 to 999, though, in practice, the digits "0" and "1" are reserved for use in other code types, such as access and area codes, and consequently are not encountered in a prefix or exchange code, as previously described.

To provide a positive check on whether a given telephone number comprises an acceptable number, the memory word locations in memory 64 addressed by the second and third digits of the prefix are provided to output codes which are determined as a function of the numerical value of the first digit of a prefix in an acceptable telephone number. The codes are determined in the following manner. If the prefix 294 is a prefix of an acceptable number, a logical "1" is located in the second digit bit location of the word location addressed by the digits 94. Similarly, if 894 is a prefix of an acceptable number, a logical "1" is located also in the digit 8 bit location of the word location addressed by the digits 94. Conversely, if the prefix 594 is a prefix of an unacceptable number, and no other number containing 94 as the second and third digit is acceptable, a logical "0" is located in the digit 5 bit location and all other bit locations of the word location addressed by the digits 94. Thus, as each three-digit prefix containing 94 as the second and third digits is received in registers 31, 32 and 33, the output appearing on lines 82–89 of memory 64 will appear as 10000010.

Recalling that the output of decoder 44 is a function of the numerical value of the digit received in register 31, it is apparent in the example described, that the only time there will be an acceptable correspondence between corresponding outputs of the decoder 44 and memory 64 is when the first digit of the prefix is a 2 or an 8 since the decoder output in those instances is, respectively, 10000000 and 00000010. In other words, for there to be a predetermined acceptable correspondence, the position of a logical "1" in the output of the decoder must correspond to the position of a logical "1" in the output of the memory. With an acceptable correspondence between any corresponding output pairs of decoder 44 and memory 64 at the time of receipt of the control signal from counter 13, an output will appear on line 100 which will prevent the generation of an interrupt signal on line 102. On the other hand, when the prefix 594 appears in the registers 31, 32 and 33, there is no acceptable correspondence between the corresponding output pairs of the decoder 44 and memory 64 and, consequently, an interrupt signal is generated on line 102.

Figure 2:
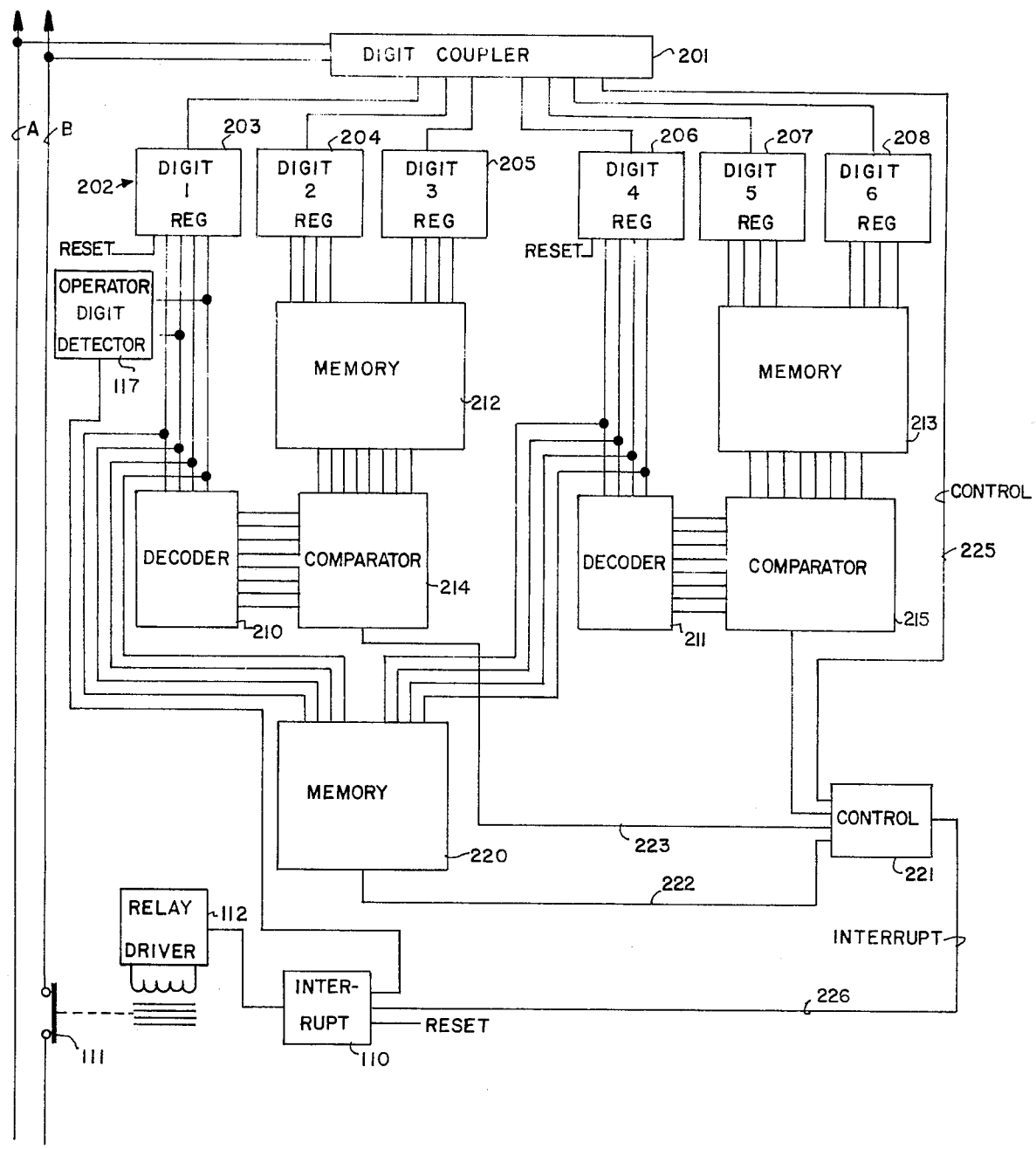
FIG. 2 is a block diagram of a six-digit checking embodiment of the present invention.

Referring to FIG. 2, there is shown another embodiment of the present invention which employs six digits of a multi-digit telephone number for purposes of checking the acceptability and non-acceptability of a telephone number which includes, for example, a three-digit area code.

Similar to that employed in the three-digit checking apparatus of FIG. 1, the apparatus of FIG. 2 employs a digit coupler 201. Coupler 201 is coupled to telephone lines A and B for detecting the digits of a multi-digit telephone number appearing on the lines and routes the digits to a digit register circuit 202 comprising a plurality of four-stage digit registers 203, 204, 205, 206, 207 and 208. Coupler 201 differs significantly from coupler 1 of FIG. 1 only in that its counter 8 includes seven instead of four stages and its gate circuit 5 includes a corresponding increase in AND gate circuit means coupled to the counter stages for routing the greater number of digits to the increased number of digit registers.

In the three-digit check apparatus of FIG. 1, only one — preferably the first — digit of a multi-digit telephone number is decoded. In the apparatus of FIG. 2, two digits are decoded, preferably the first and the fourth, the first being the first digit of the area code and the second being the first digit of the prefix or exchange code. The need for decoding two digits is occasioned by the larger number of digits used and the use of the first digits of the area and exchange codes is made to take advantage of the fact that only eight out of the ten possible decimal digits are used for these digits in conventional telephone systems, as previously described.

For these reasons, there is provided, coupled to digit registers 203 and 206, a pair of modified 1-out-of-10 decoders 210 and 211, respectively. Decoders 210 and 211 each have eight output lines for the reasons described in respect to FIG. 1, and decode the digits in registers 204 and 206 to provide a logical "1" output on one of their respective output lines in response to the numerical value of the digit decoded. The registers not coupled to a decoder are coupled, respectively, to a pair of memories 212 and 213 for addressing of the memories. Memory 212 is coupled to registers 204 and 205. Memory 213 is coupled to registers 207 and 208. Decoders 210 and 211 and memories 212 and 213 are identical to the decoder 44 and memory 64 of FIG. 1 and, as in FIG. 1, are coupled, respectively, to separate comparator circuits 214 and 215 which are also identical to comparator 90 of FIG. 1.

Because of the larger number of digits used for checking, there is supplied a corresponding increase in the level of decoding which is provided by a third memory 220 and a four-input control circuit 221. The address inputs of memory 220 are coupled to digit registers 203 and 206. Control circuit 221 receives its inputs from memory 220 on a line 222, comparator 214 and 215 on lines 223 and 224, respectively, and from the last — i.e., seventh — stage of the counter 8 in digit coupler 201 on a line 225. Unlike memories 212 and 213, memory 220 is provided only with a single output line 222 which is common to all word locations in the memory addressed by the digits in registers 203 and 206. In the word locations addressed by the first and fourth digits of acceptable numbers in registers 203 and 206 there is located a logical "1" which will be outputted on line 222 when an acceptable number is dialed. Memories 212 and 213 are provided with coded words in the same fashion as described with respect to memory 64 of FIG. 1 for outputting on lines 223 and 224, a logical "1" if there is an acceptable correspondence between their respective outputs and the outputs of their associated decoder 210 and 211, respectively. Control circuit 221, coupled to lines 222, 223, 224 and 225, is provided to output no signal in the event there is a coincidence of logical "1's" on its input lines and to output an interrupt signal on a line 226, coupled to the interrupt circuit 110, in the event there is a lack of coincidence between the signals on its input lines, as will occur if the sequence of digits in registers 203–208 are the first six digits of an unacceptable telephone number.

Figure 3:
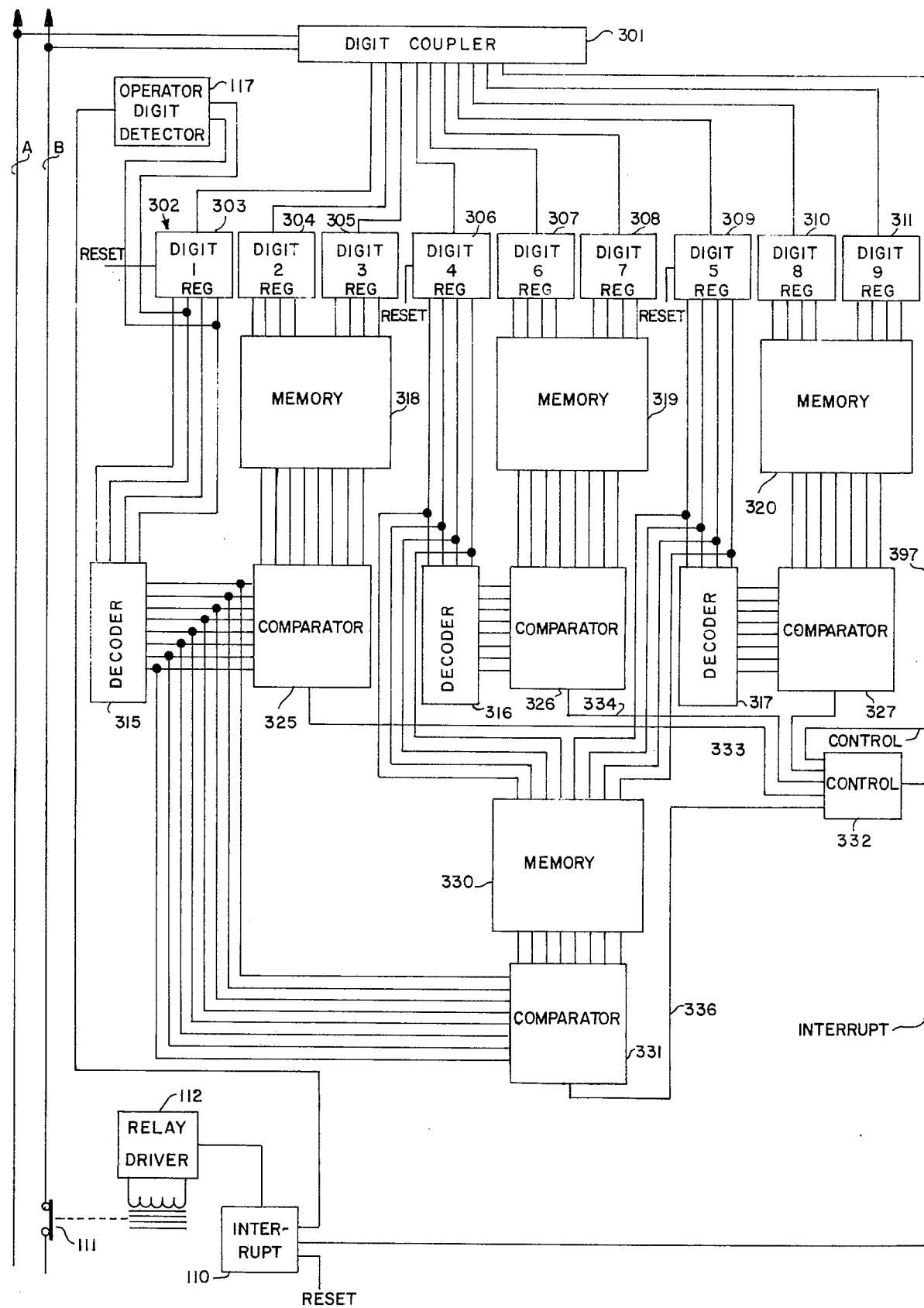
FIG. 3 is a block diagram of a nine-digit checking embodiment of the present invention.

Referring to FIG. 3, there is shown still another embodiment of the present invention which employs nine digits of a multi-digit telephone number for checking the acceptablity and non-acceptability of a telephone number which includes codes in addition to an area code and prefix code, or when it is desired to restrict calls to numbers in a given locality in which other numbers are acceptable.

As was described with respect to FIGS. 1 and 2, there is provided in the apparatus of FIG. 3, a digit coupler 301. Coupler 301 is coupled to a pair of telephone lines A and B and to a digit register circuit 302 comprising a plurality of digit registers 303, 304, 305, 306, 307, 308, 309, 310 and 311 for detecting and routing a predetermined plurality of nine digits appearing on the lines to the registers. Coupler 301 is substantially the same as couplers 201 and 1 except for an expanded counter 8 having 10 stages and an expanded gate circuitry 5 to handle the expanded routing task.

In the three-digit checking apparatus of FIG. 1, only one digit, the first dialed, is decoded. In the six-digit checking apparatus of FIG. 2, the first and fourth digits dialed are decoded. In the present embodiment, the first, the fourth and the fifth digits dialed are decoded. As described with respect to the apparatus of FIG. 2, the need for decoding three digits is occasioned by the still larger number of digits used for checking. The first, fourth and fifth digits are used for this purpose because, as in the first and fourth, conventional telephone systems also do not employ either a "0" or a "1" in the fifth digit.

To decode the first, fourth and fifth detected digits, there is coupled to registers 303, 306 and 309 a plurality of modified 1-out-of-10 decoders 315, 316 and 317, respectively. As in the apparatus of FIG. 1 and 2, the modification to the decoders comprises the use of eight instead of 10 possible outputs. Coupled to registers 304 and 305 is a memory 318. Coupled to registers 307 and 308 is a memory 319. Coupled to registers 310 and 311 is a memory 320. The outputs of memories 318, 319 and 320 and the outputs of their respective associated decoders 315–317 are coupled, respectively, to a plurality of comparators 325, 326 and 327, each comprising a plurality of AND gates as described with respect to the apparatus of FIG. 1.

Because of the larger number of digits used for checking purposes in the nine-digit checking scheme, there is further provided a fourth memory 330 and a fourth comparator 331. Memory 330 is coupled to registers 306 and 309 for addressing. Comparator 331 is coupled to the output lines of memory 330 and the output lines of decoder 315. The outputs of comparators 325, 326, 327 and 331 are coupled to a control circuit 332 by means of a plurality of lines 333, 334, 335 and 336, respectively. Control circuit 332 is also coupled to the last – i.e., tenth – stage of the counter 8 of coupler 301 by a line 337 for receiving a control signal from the tenth stage of the counter 8 in the coupler.

In operation, the first, fourth and fifth digits dialed are sent to registers 302, 306 and 309, respectively, for decoding because these digits, in normal telephone service, never comprise the digits "0" and "1". The fourth and fifth digits also address memory 330. The second, third, sixth, seventh, eighth and ninth digits are used to address the memories 318, 319 and 320. Each of the memories contains codes corresponding to acceptable numbers in which the logical "1's" and "0's" are arranged as previously described. For exmple, if 794-328-5627 is an acceptable number, memory 318 will have stored in the word addressed by the second and third digits 9 and 4 the code 00000100, memory 319 will have stored in the word addressed by the sixth and seventh digits 8 and 5 the code 01000000 and memory 320 will have stored in the word addressed by the eighth and ninth digits 6 and 2 the code 10000000. These codes correspond, respectively, to the decoding of the first, fourth and fifth digits – namely, the digits 7, 3 and 2. Similarly, the memory 331 will have stored in the word addressed by the fourth and fifth digits 3 and 2 the code 00000100 since the fourth and fifth digits are compared with the first digit in the comparator 331 coupled to that memory.

If all of the comparators provide an output in response to their associated inputs, this indicates that the digits with which they are associated comprise an acceptable combination. But, if any one of the comparators fails to provide an output, an interrupt signal is generated by control circuit 332 and relay driver 112 is operated.

Figure 4A:
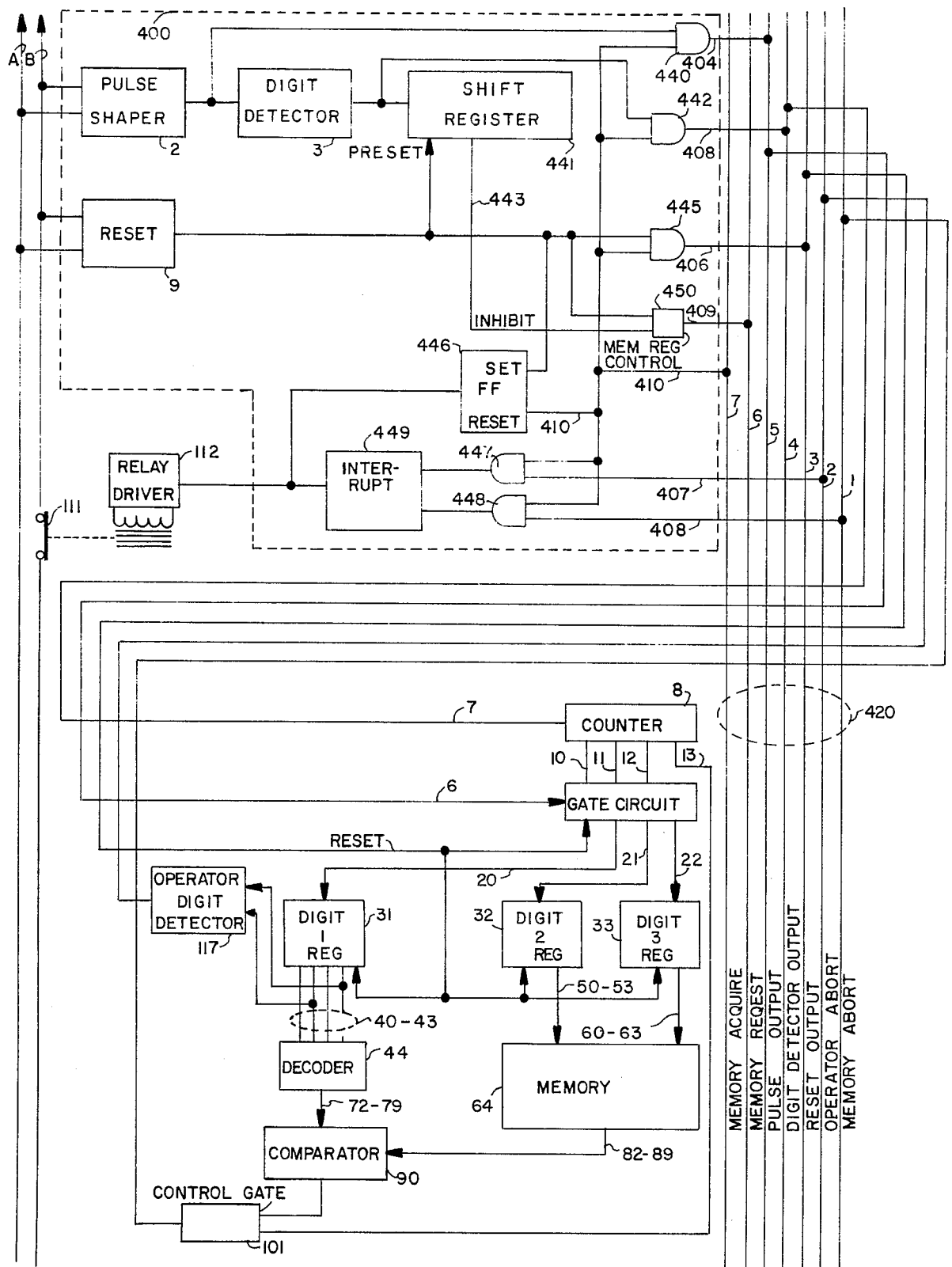
FIG. 4a and 4b are block diagrams of a multiple trunk line embodiment of the present invention.
Figure 4B:
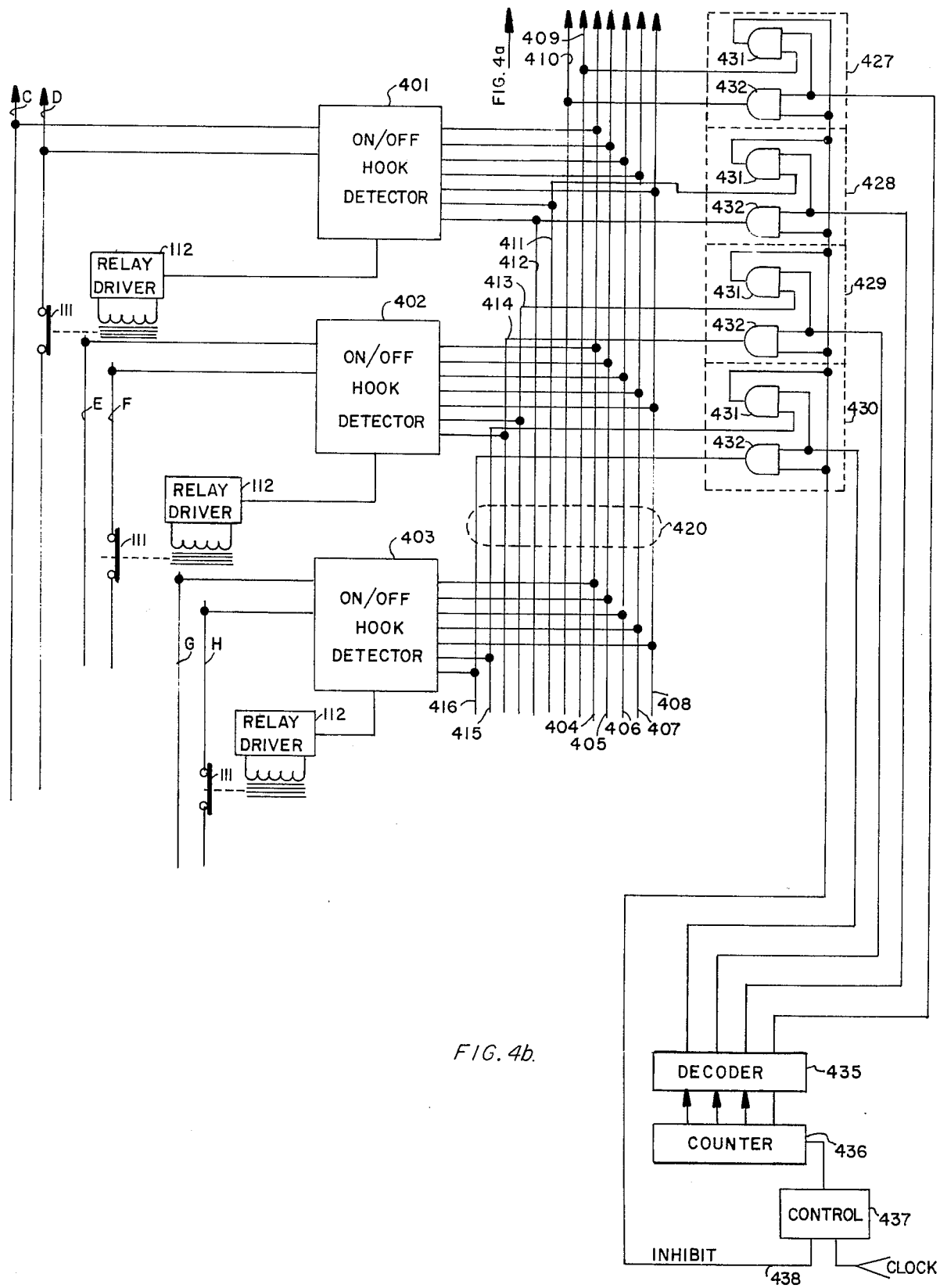

Referring to FIG. 4, there is shown still another embodiment of the present invention, in which the three-digit checking apparatus of FIG. 1 is employed to check the acceptability of telephone numbers on a plurality of separate trunk or extension lines comprising line pairs A and B, C and D, E and F, and G and H. As to those circuit elements which are identical to, and were described in the discussion of the apparatus of FIG. 1, the numerical designators remain the same and reference may be made to the earlier discussion for details.

Coupled to line pairs A–H, respectively, are a plurality of four ON/OFF hook detector circuits designated generally as 400, 401, 402 and 403. Each of the circuits 400–403 is provided with a plurality of lines 404, 405, 406, 407 and 408 which are coupled in parallel to corresponding lines of a plural line bus 420, the lines of which are designated, respectively, as Pulse Output, Digit Detector Output, Reset Output, Operator Abort and Memory Abort. Additionally, each of circuits 400–403 is coupled by means of a pair of lines 409 and 410, 411 and 412, 413 and 414, and 415 and 416, to corresponding pairs of lines of bus 420, designated, respectively, as Memory Request and Memory Acquire. Coupled to corresponding ones of lines 409–416 is a plurality of gate circuits 427, 428, 429 and 430, each comprising a pair of gates 431 and 432. A control for gate circuits 427–430 is provided by a 1-out-of-4 decoder 435 driven by a four-stage ring counter 436, which receives clock pulses from a source of a.c. power (not shown) through a control circuit 437. An inhibit line 438 is also provided as an input to control circuit 437 from gates 431 in each of circuits 427–430 to prevent the advancing of counter 436 as required.

Each of circuits 400–403 being substantially identical, it is believed sufficient in only one, circuit 400, is described, recognizing that for purposes of this embodiment, the pulse shaper 2, digit detector 3 and reset circuit 9 of FIG. 1 is removed therefrom and used in the circuits 400–403.

In circuit 400, therefore, pulse shaper 2 is coupled to lines A and B for shaping the digit pulses appearing on the lines and for providing an input to digit detector 3 and a gate 440. The output of gate 440 is coupled via bus line 404 to gate circuit 5 for routing of the digits to digit registers 31, 32 and 33. The output of detector 3 is coupled to a counter 441 and to a gate 442. The output of gate 442 is coupled via bus line 405 to counter 8 for controlling the gate circuit 5. Counter 441 is a ten-stage register and has coupled to its fourth through tenth stages a line 443 for providing an input to a gate 450. Previously described reset circuit 9, coupled to lines A and B, is coupled to counter 441, a gate 445, the set input of a flip-flop 446 and, via the gate 450 and a Memory Request bus line 409, to the gate 431 of the gate circuit 427. The output of gate 445 is coupled to the reset inputs of counter 8 and to the reset inputs of digit registers 31, 32 and 33 via the bus line 406. The reset input of flip-flop 446 is coupled to the gate 432 of gate circuit 427 by the Memory Acquire bus line 410. The operator digit detector 117, coupled to digit register 31, is coupled to a gate 447. The control gate 101, coupled to the output of comparator 90 and the fourth stage of counter 8, is coupled to a gate 448. The outputs of gates 447 and 448 are coupled to an interrupt circuit 449. The output of interrupt circuit 449 and the output of flip-flop 446 is coupled to the relay driver 112 for operating the solenoid-controlled switch 111.

In operation, when a telephone unit coupled to lines A and B is picked off its hook, a change in potential across the lines A and B is detected by reset circuit 9. The change in potential results in an output from reset circuit 9, which clears and sets the first stage of a shift register 441, sets flip-flop 446 and provides a memory request signal on bus line 409 via the memory request control gate circuit 450, enabling gate 431 of gate circuit 427. The setting of flip-flop 446 provides an abort signal on its output, which activates relay driver 112, preventing a dial tone from appearing on lines A and B, and preventing further use of the line until a memory acquire signal is received. At the same time, if not inhibited by another caller using one of the other trunk lines, counter 436 is advanced by clock pulses from a source (not shown) through the control circuit 437. As counter 436 advances, decoder 435 provides an output sequentially to each of gate circuits 427–430. When gate 431 of gate circuit 427 receives an input from decoder 435, an output is generated on line 438, inhibiting control circuit 437 and preventing the further advancement of counter 436. The inhibiting of control circuit 437 and stopping of counter 436 holds the output of decoder 435 to gate circuit 427. With an input from gate 431 of circuit 427, as well as an input from decoder 435, the memory acquire signal is provided by gate 432 on bus line 410. The memory acquire signal resets flip-flop 446, removing the previously set abort signal, re-establishing the dial tone, permitting a caller to initiate dialing. The memory acquire signal on line 410 also enables each of gates 440, 442, 445, 447 and 448.

As the caller dials, voltage pulses corresponding to the digit dialed are generated on lines A and B. The pulses are received by pulse shaper 2, shaped and sent to digit detector 3 and gate circuit 5 via gate 440 and line 6. Digit detector 3, in response to the pulses from shaper 2, provides an output corresponding to each digit, which shifts register 441 and, via gate 440, advances counter 8. As counter 8 advances, outputs appear sequentially on lines 10, 11 and 12 and route the pulses from shaper 2 on line 6 for each digit dialed to digit registers 31, 32 and 33, respectively. Thus, if the first three digits dialed are 754, seven pulses are fed to register 31, five pulses are fed to register 32 and four pulses are fed to register 33.

The digit in register 31 is decoded by the decoder 44 and provides an output on one of its eight output lines. If the digit is a 7, the output signal — e.g., a logical "1" — appears on the seventh digit output line. Similarly, if the digit is a 5, the output, a logical "1", appears on the fifth digit output line. The digits in registers 32 and 33, on the other hand, address an eight-bit word in memory 64. The words in memory 64 are pre-stored eight-bit codes corresponding to acceptable numbers. The codes, when addressed, appear on eight output lines as logical "1's" and "0's." If, as before, 754 is an acceptable prefix, an output — e.g., a logical "1" — appears on the output line coupled to the digit 7 bit location of the word location addressed by the digits 54. Unlike decoder 44, however, more than one signal — e.g., logical "1" — may be outputted by the memory from a given addressed word location at the same time. Thus, if 554 is also an acceptable prefix, an output — e.g., a logical "1" — will also appear on the output line coupled to the digit 5 bit location of the word location addressed by the digits 54. All other bit locations would be logical "0's" unless, of course, still another prefix having 54 as the second and third digits is acceptable. Conversely, if the digits 654 are a prefix to an unacceptable number, there will be no corresponding signal — e.g., logical "1" — appearing on the sixth digit output lines of the memory 64 to match with the signal — e.g., logical "1" — appearing on the sixth digit output line of the decoder 44 when the same is dialed.

When the fourth digit is dialed, an output is provided by counter 8 on line 13 and applied to gate 101. With gate 101 enabled, if an unacceptable number has been dialed, a memory abort signal is applied to bus line 408 and, through gate 448, to an input of the interrupt circuit 449 to activate the relay driver 112. As before, activation of driver 112 aborts the call by causing the dial tone to appear on lines A and B.

If the first digit dialed is a special digit, such as "0" used for calling an operator, the output of the operator digit detector 117, coupled to digit register 31, generates an operator abort signal. The operator abort signal is applied to bus line 407 and, via a gate 447, to interrupt circuit 449 to drive relay driver 112 as described above.

At the same time as counter 8 is being advanced by digit detector 3, shift register 441 is advanced. When register 441 reaches its fourth stage on the dialing of the fourth digit, and for every digit dialed thereafter, an inhibit signal is generated on the line 443 inhibiting gate 450. When gate 450 is inhibited, the memory request signal on bus line 409 is terminated, terminating the inhibit signal on line 438 and the memory acquire signal on line 410, and releasing the ring counter 436 to sequence decoder 435. In this fashion, the decoder 44, memory 64 and associated circuits to the right of bus lines 420 are made available for use by a caller on another of the trunk lines immediately upon dialing of the fourth digit, and nothing the second caller does by way of dialing either an acceptable or an unacceptable number will abort the call of the first caller.

While described employing the three-digit checking apparatus of FIG. 1, it is believed clear that the apparatus of FIG. 4 may also employ the six-digit checking apparatus of FIG. 2 or the nine-digit checking apparatus of FIG. 3. Moreover, all of the apparatus described are compatible with multi-frequency signalling equipment by simply locating a conventional multi-frequency signal to pulse converter in the input of pulse shaper 2 by simply breaking the input line as at point X in FIG. 1 and inserting in series a Frequency-to-Pulse converter.

It is apparent from the foregoing that any number of modifications to and departures from the apparatus described may be made by those skilled in the art without departing from the true spirit and scope of the invention. Accordingly, the embodiments described are only intended as illustrative of preferred embodiments of the invention, the true spirit and scope of which is as hereafter claimed.

What is claimed is:

1. A telephone call restrictor comprising:
   a digit register means for receiving a plurality of digits of a multi-digit telephone number from a telephone line;
   means for coupling said digit register means to said telephone line;
   decoding means coupled to said digit register means and responsive to a first predetermined number of said plurality of digits for providing a first plurality of outputs;
   second means coupled to said digit register means and addressable by a second predetermined number of said plurality of digits for providing a second plurality of outputs; and
   means responsive to said first and said second pluralities of outputs for providing an interrupt signal to prevent the completion of a call to said telephone number in the absence of a predetermined correspondence between said first and said second outputs.

2. A telephone call restrictor according to claim 1 wherein one of said plurality of digits is a predetermined digit, and further comprising means coupled to said digit register means and responsive to said predetermined digit for providing an interrupt signal to prevent the completion of a telephone call using said one digit.

3. A telephone call restrictor according to claim 1 wherein said first means for providing a first output in response to a first one of said plurality of digits comprises decoding means having a plurality of output lines for providing said first output on a predetermined one of said plurality of output lines, said predetermined one of said plurality of output lines being determined by the numerical value of said first digit and wherein said second means for providing a second output in response to the others of said plurality of digits comprises an addressable memory means addressable by said others of said plurality of digits having a plurality of output lines for providing said second output.

4. A telephone call restrictor according to claim 3 wherein said addressable memory means comprises means for storing predetermined codes for comparison with said first output from said decoding means.

5. A telephone call restrictor according to claim 1 wherein said digit register means comprises a plurality of digit registers and said coupling means comprises means for routing each of said plurality of digits to a predetermined one of said digit registers.

6. A telephone call restrictor according to claim 5 wherein said routing means comprises:
   a digit detector for detecting each digit in said plurality of digits;
   a counter coupled to said digit detector having a plurality of stages for counting said detected digits and gate means responsive to said counting of said digits having an input for receiving said digits and being coupled between said counter stages and said plurality of digit registers for providing said routing of said digits to said digit registers.

7. A telephone call restrictor according to claim 1 wherein said plurality of digits are represented by multi-frequency a.c. signals and said coupling means comprises means for converting said a.c. signals to a predetermined number of voltage pulses, said predetermined number of voltage pulses being determined by the numerical value of each of said digits.

8. A telephone call restrictor according to claim 1 wherein said digit register means comprises a plurality of digit registers each having a plurality of corresponding output lines, said first means comprising a decoding means having a plurality of output lines, and said second means comprising a plurality of addressable memory means, each having a plurality of corresponding address lines and a plurality of corresponding output lines and further comprising:
   means for coupling corresponding ones of said output lines of each of said digit registers to said address lines of a corresponding one of each of said memory means;
   a first plurality of gate means each having a plurality of input lines and an output line;
   means for coupling corresponding ones of said output lines of each of said memories to said input lines of a corresponding one of each of said first plurality of gate means;
   a second plurality of gate means each having a plurality of input lines and an output line; and
   means for coupling a corresponding one of each of said second plurality of gate means to said output line of a corresponding one of said first plurality of gate means and a corresponding output line of said decoding means for providing said interrupt signal on at least one of said output lines of said second plurality of gate means in the event there is said unacceptable correspondence between said first and said second outputs.

9. A telephone call restrictor comprising:

digit register means for receiving the storing a plurality of digits of a multi-digit telephone number;

decoding means for decoding a first one of said plurality of digits stored in said digit register means for providing a predetermined output corresponding to the numerical value of said first digit;

memory means having a plurality of memory locations addressable by said remaining ones of said plurality of digits in said digit register means, in which predetermined ones of said locations contain a code corresponding to an acceptable combination of said plurality of digits and operable in response to said remaining ones of said plurality of digits for providing an output from said memory locations; and means responsive to an output from said decoding means and an output from said memory means for comparing said outputs and providing an interrupt signal in the absence of a predetermined correspondence between said outputs.

10. A telephone call restrictor for allowing calls to acceptable telephone numbers and preventing calls to unacceptable telephone numbers comprising:

first register means for storing a first digit of a plurality of digits of a multi-digit telephone number;

second register means for storing the remaining ones of said plurality of digits of said multi-digit telephone number;

decoding means having a first plurality of output lines coupled to said first register means and responsive to said first digit for decoding said first digit and outputting a predetermined signal on one of said first plurality of output lines;

memory means having a second plurality of output lines corresponding to said first plurality of output lines coupled to said second register means and responsive to predetermined ones of said remaining ones of said plurality of digits for outputting a predetermined signal on one of said second plurality of output lines;

means matching the output signals on corresponding pairs of said first and second plurality of output lines for providing an interrupt signal if there is no match between the output signals on any of said pairs; and means responsive to said interrupt signal for preventing the completion of a telephone call to said telephone number causing said interrupt signal.

11. A telephone call restrictor according to claim 1 wherein said coupling means comprises:

a plurality of ON/OFF hook detector circuit means;

means for coupling each of said detector circuit means to a predetermined one of a plurality of telephone lines;

means for coupling each of said detector circuit means to a multi-line bus circuit means;

means for coupling said digit register means to said bus circuit means; and means for interrogating each of said detector circuit means and responsive to a first output signal from a first one of said detector circuit means for providing a first transfer of digits of a telephone number to said digit register means via said bus circuit means from said telephone line to which said first one of said detector circuits is coupled, and for preventing the transfer of digits of a telephone number to said digit register means from another of said telephone lines until said first transfer is completed.

12. A telephone call restrictor according to claim 11 wherein said detector circuit means interrogating means comprises:

means for interrogating each of said plurality of detector circuit means in a predetermined sequence for a predetermined input signal.

13. A telephone call restrictor according to claim 12 wherein said interrogating means comprises:

a plurality of gate means;

a counter coupled to said gate means; and means for coupling said counter to a source of clock pulses for advancing said counter and enabling said gate means in a predetermined sequence, said gate means, if enabled, being responsive to said predetermined input signal from said first one of said plurality of detector circuit means for inhibiting the advancement of said counter, and responsive to a termination of said predetermined input signal upon the completion of said first transfer of digits for enabling the further advancement of said counter.

14. A telephone call restrictor according to claim 13 wherein each of said plurality of detector circuits comprises reset circuit means responsive to a change in potential occurring on a telephone line to which it is connected for providing said predetermined input signal to said gate means.

15. A telephone call restrictor according to claim 14 wherein said reset circuit means comprises means responsive to a change in potential occurring on a telephone line to which it is connected when the cradle switch of a telephone unit coupled to said line is switched.

16. A telephone call restrictor according to claim 15 wherein each of said plurality of detector circuits comprises:

switch means;

means for coupling said switch means to the telephone line to which an associated detector circuit is coupled; and switch control means responsive to an input signal coupled to said switch means for controlling the opening and closing of said switch means, said opening of said switch means serving to prevent the transmission of electrical signals on said telephone line, and said closing of said switch means serving to cause a dial tone on said telephone line.

17. A telephone call restrictor according to claim 16 wherein each of said plurality of detector circuits comprises:

first means responsive to a first input from said reset circuit means for opening said switch means and to a second input from said detector circuit interrogating means for closing said switch means; and second means responsive to said interrupt signal providing means for opening said switch means for a predetermined period of time.

18. A telephone call restrictor according to claim 17 wherein said predetermined period of time is of sufficient length to insure the appearance of a dial tone on the telephone line upon said closing of said switch means.

19. A telephone call restrictor apparatus operable in response to digits of a telephone number dialed on a telephone line comprising:
    decoding means responsive to a first predetermined number of said digits for decoding said first predetermined number of digits and providing a first output;
    means responsive to a second predetermined number of said digits for decoding said second predetermined number of said digits and providing a second output; and
    means responsive to said first and said second outputs for preventing the completion of a call to said telephone number in the absence of a predetermined correspondence between said first and said second outputs.

20. An apparatus according to claim 19 wherein said preventing means comprises means for providing a dial tone on said telephone line.

21. An apparatus according to claim 19 wherein said first output providing means comprises:
    first decoding means having a plurality of outputs for decoding said first predetermined number of digits;
    said second output providing means comprises second decoding means having a plurality of outputs for decoding said second predetermined number of digits; and
    said preventing means comprises comparing means for comparing said outputs of said first and said second decoding means.

22. An apparatus according to claim 21 wherein said first decoding means comprises a 1-out-of-N decoding means, said second decoding means comprises an addressable memory means addressable by said second predetermined number of digits and said preventing means comprises means responsive to said 1-out-of-N decoding means and said addressable memory means for providing a dial tone on said telephone line.

* * * * *